(12) United States Patent
Murata et al.

(10) Patent No.: US 7,168,320 B2
(45) Date of Patent: Jan. 30, 2007

(54) METHOD AND UNIT FOR SENSING PHYSICAL QUANTITY USING CAPACITIVE SENSOR

(75) Inventors: Minoru Murata, Oobu (JP); Takaaki Kawai, Oobu (JP)

(73) Assignee: Denso Corporation, Kariya (JP)

( * ) Notice: Subject to any disclaimer, the term of this patent is extended or adjusted under 35 U.S.C. 154(b) by 77 days.

(21) Appl. No.: 10/895,978

(22) Filed: Jul. 22, 2004

(65) Prior Publication Data

US 2005/0016273 A1  Jan. 27, 2005

(30) Foreign Application Priority Data

Jul. 25, 2003 (JP) .............................. 2003-279960

(51) Int. Cl.
*G01P 15/125* (2006.01)

(52) U.S. Cl. .................................. 73/514.32

(58) Field of Classification Search ...................... None
See application file for complete search history.

(56) References Cited

U.S. PATENT DOCUMENTS 5,618,989 A     4/1997  Marek
6,257,061 B1 *  7/2001  Nonoyama et al. ...... 73/514.32
6,450,029 B1 *  9/2002  Sakai et al. .................... 73/488
6,483,322 B2   11/2002  Aoyama et al.
2002/0011107 A1 * 1/2002  Sakai et al. .............. 73/514.32

FOREIGN PATENT DOCUMENTS

JP      6-160429    6/1994
JP      8-110355    4/1996
JP      2002-40047  2/2002

* cited by examiner

*Primary Examiner*—Hezron Williams
*Assistant Examiner*—John C. Hanley
(74) *Attorney, Agent, or Firm*—Posz Law Group, PLC

(57) ABSTRACT

A physical quantity (e.g., acceleration) sensing unit is provided. In this unit, a capacitive sensor has first and second fixed electrodes and a physical-quantity-sensitive movable electrode disposed between the first and second fixed electrodes. An adjusting circuit first adjusts a first bias voltage applied between the first fixed electrode and the movable electrode and a second voltage applied between the movable electrode and the second fixed electrode so that the movable electrode is brought into contact with either the first or second fixed electrode. The adjusting circuit then adjusts the first and second bias voltages to return the movable electrode to its original position. A detecting circuit detects an output on a capacitance relationship among the first and second fixed electrodes and the movable electrode. The output is subjected to determination of whether or not the output is out of order, when tested.

18 Claims, 4 Drawing Sheets

METHOD AND UNIT FOR SENSING PHYSICAL QUANTITY USING CAPACITIVE SENSOR

BACKGROUND OF THE INVENTION

1. Technical Field

The present invention relates to a physical quantity sensing unit equipped with a capacitive sensor and a physical quantity sensing method carried out in the sensing unit, which are directed to sensing physical quantity such as acceleration, and in particular, the physical quantity sensing method and unit that are able to perform self-diagnosis against a sticking phenomenon caused between electrodes incorporated in the capacitive sensor.

2. Related Art

In recent years, people's consciousness for safety of automobiles has been increased noticeably, so that an airbag system has been mounted on vehicles as standard equipment. Under such a situation, a great deal of demand for compact acceleration sensors of higher accuracy and higher reliability has arisen as a sensor for sensing vehicle's collisions.

The acceleration sensor includes various types of sensors depending on how to detect acceleration, such as piezoelectric type of sensor and capacitive type of sensor. The mainstream is the capacitive type of acceleration sensor, because the sensor can be manufactured with some advantages, such as higher detection sensitivity and less temperature drift.

A capacitive type of semiconductor-made acceleration sensor is provided as one type of such sensors. This acceleration sensor is equipped with a pair of fixed electrodes and a movable electrode disposed to face each fixed electrode between the fixed electrodes. The movable electrode serves as a movable member which can be displaced depending on amplitudes of acceleration to be applied to the sensor. A difference capacitor is formed between the two variable capacitors each of which composed of the movable electrode and either fixed electrode. Changes in the capacitance of the difference capacitor are detected as signals indicative of the acceleration to be applied.

By the way, in cases where such a capacitive type of sensor receives acceleration of an excessive amplitude or is in the process of manufacturing, there may occur a phenomenon called sticking phenomenon that makes it impossible or difficult to unstick the movable electrode from a fixed electrode after the movable electrode has stuck to the fixed electrode. In a stuck state of the movable electrode to a fixed electrode, detecting the acceleration with precision is difficult. Hence it is required to perform a self-diagnosis for possible sticking phenomena in recognizing whether or not the normal detection can be carried out.

Some types of sensors to cope with the above difficulty have already been proposed. One type of sensor, which is proposed by Japanese Patent Laid-open No. 8-110355, is a capacitive type of sensor that has a function of determining that an acceleration signal outputted from the sensor shows a true value thereof, have experienced a sensor's erroneous detection, or results from an erroneous operation of an electrical apparatus in charge of evaluating the signal.

Another type of sensor, which has already been proposed by the present applicant in Japanese Patent Laid-open No. 2002-040047; has already been realized as an angular velocity sensor. This sensor has a self-diagnosis function to diagnose whether or not the sensor outputs an accurate signal, without requiring pads dedicated to the self-diagnosis or a further electrode dedicated to generating an electrostatic attraction.

However, the foregoing conventional sensors still have a drawback that the self-diagnosis owned by the sensors is permitted to be performed only when the movable member is displaced to the extent that an output signal from the sensor is limited within a certain level. In other words, it is an unexpected circumstance for the conventional sensors to have reception of an excessive acceleration, so that the conventional sensors cannot be tested with regard to whether or not the movable member is able to surely return to its original position when the movable electrode is largely displaced to touch with a fixed electrode.

In addition, observing the sensor states before and after the application of an excessive acceleration may be performed under a hammering test, which actually gives an excessive acceleration to a sensor. This test faces, however, some difficulties because as an apparatus for the test becomes larger in its size, the test takes a negligible period of time because it is mechanically carried out. Hence, in practice, it is almost impossible to test all the sensors produced in a large scale.

SUMMARY OF THE INVENTION

The present invention has been made with due consideration to the foregoing difficulties, and an object of the present invention is to provide a method and unit for sensing physical quantity such as acceleration, which are able to easily self-diagnose (self-test) the sticking characteristic inherent to each capacitive sensor incorporated in the unit, the self-diagnosis being carried out with the sticking caused surely on the assumption that an excessive-amplitude physical quantity has been applied to the unit.

In order to achieve the above object, as one aspect of the present invention, there is provided a unit for sensing physical quantity. The unit comprises a capacitive sensor, an adjusting circuit, and a detecting circuit. Of these, the capacitive sensor is equipped with a first fixed electrode and a second electrode disposed face to face and a movable electrode disposed between the first and second fixed electrodes to be movable in response to the physical quantity and to be face to face between the first and second fixed electrodes. The adjusting circuit first adjusts a first bias voltage applied between the first fixed electrode and the movable electrode and a second voltage applied between the movable electrode and the second fixed electrode so that the movable electrode is brought into contact with either of the first and second fixed electrodes. The adjusting circuit then adjusts the first and second bias voltages to return the movable electrode to an original position thereof. The detecting circuit detects an output signal corresponding to a relationship of capacitance among the first and second fixed electrodes and the movable electrode. The output signal is subjected to determination of whether or not the output signal is out of order when a test mode of the unit is instructed.

Hence, in the test mode, if the movable electrode sticks to a fixed electrode after the first and second bias voltages have been adjusted to return the movable electrode to an original position thereof, the output signal from the detecting circuit will exhibit a value different from the normal one. Using this output signal, it is possible to determine that a sticking phenomenon has occurred between the movable electrode and a fixed electrode. Accordingly, there can be provided the unit which is able to easily self-diagnose (self-test) the sticking characteristic inherent to each capacitive sensor incorporated in the unit. The self-diagnosis can thus be carried out with the sticking caused surely on the assumption that an excessive-amplitude physical quantity has been applied to the unit.

As a second aspect of the present invention, there is provided a method of sensing physical quantity using a capacitive sensor equipped with a first fixed electrode and a second fixed electrode disposed face to face and a movable electrode disposed between the first and second fixed electrodes to be movable in response to the physical quantity and to be face to face between the first and second fixed electrodes. The method comprises a step of first adjusting a first bias voltage applied between the first fixed electrode and the movable electrode and a second voltage applied between the movable electrode and the second fixed electrode so that the movable electrode is brought into contact with either of the first and second fixed electrodes; a step of second adjusting the first and second bias voltages to return the movable electrode to an original position thereof, the first adjustment preceding the second adjustment; and a step of detecting an output signal corresponding to a relationship of capacitance among the first and second fixed electrodes and the movable electrode. The output signal is subjected to determination of whether or not the output signal is out of order when a test mode is instructed.

The same advantages as those obtained as the foregoing sensing unit can therefore be gained.

As a third aspect of the present invention, there is provided an on-vehicle airbag system comprising an airbag unit mounted on a vehicle and formed to have an airbag; a physical quantity sensing unit sensing a physical quantity as a signal indicative of the sensed physical quantity; and a controller controlling a development of the airbag in response to the signal outputted by the sensing unit. The physical quantity sensing unit comprises a capacitive sensor equipped with a first fixed electrode and a second fixed electrode disposed face to face and a movable electrode disposed between the first and second fixed electrodes to be movable in response to the physical quantity and to be face to face between the first and second fixed electrodes; an adjusting circuit first adjusting a first bias voltage applied between the first fixed electrode and the movable electrode and a second voltage applied between the movable electrode and the second fixed electrode so that the movable electrode is brought into contact with either of the first and second fixed electrodes, and then adjusting the first and second bias voltages to return the movable electrode to an original position thereof, the first adjustment preceding the second adjustment; a detecting circuit detecting the signal corresponding to a relationship of capacitance among the first and second fixed electrodes and the movable electrode; and a determining unit determining whether or not the output signal detected by the detecting circuit on completion of the second adjustment is out of order.

Even for this on-vehicle airbag system, the physical quantity sensing unit is mounted, so that the same advantages as those obtained as the foregoing sensing unit can therefore be gained.

BRIEF DESCRIPTION OF THE DRAWINGS

Other objects and aspects of the present invention will become apparent from the following description and embodiments with reference to the accompanying drawings in which.

DETAILED DESCRIPTION OF PREFERRED EMBODIMENTS

Referring to the accompanying drawings, preferred embodiments of the present invention will now be described.

First Embodiment

Figure 1:
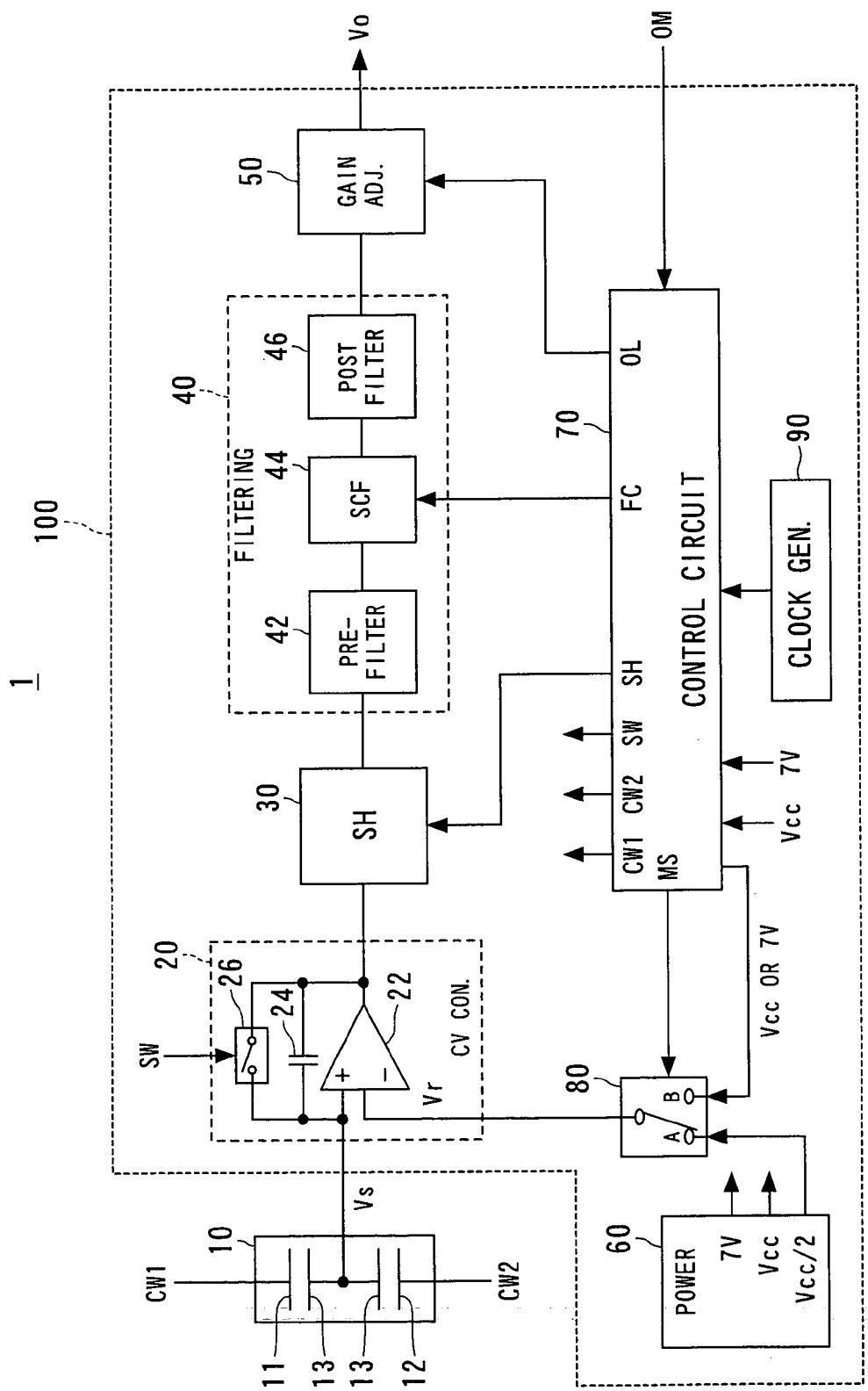
FIG. 1 is a block diagram outlining the configuration of a capacitive acceleration sensing unit according to an embodiment of the present invention, the sensing unit having a self-diagnosis function for the sticking phenomenon.
Figure 2:
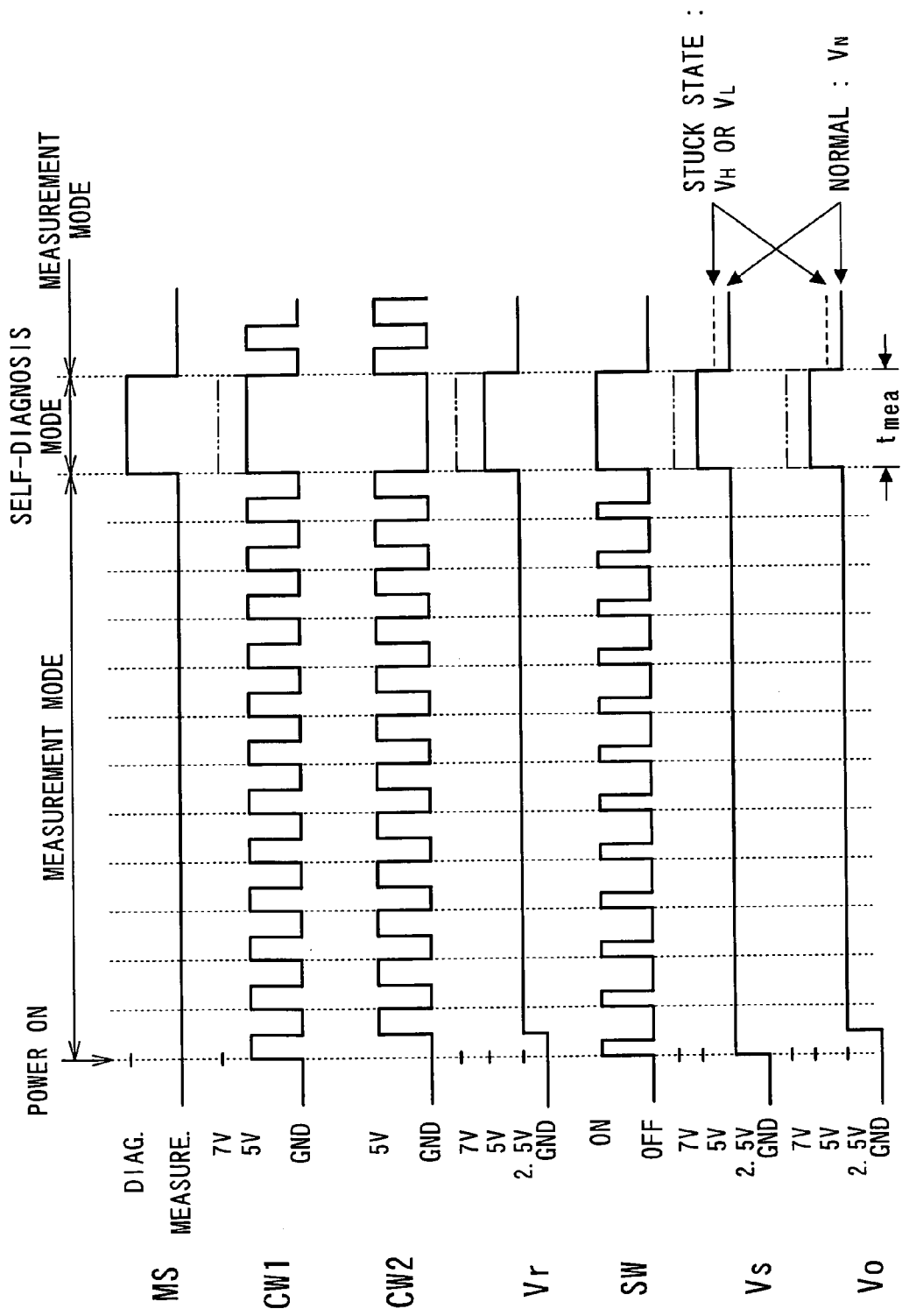
FIG. 2 is a timing chart explaining an operation of the capacitive acceleration sensor in the embodiment.

Referring to FIGS. 1–2, a capacitive acceleration sensing unit according to a first embodiment of the present invention will now be described. In the first embodiment, the physical quantity sensing unit of the present invention is reduced into practice as the capacitive acceleration sensing unit.

FIG. 1 shows in block form the configuration of the capacitive acceleration sensing unit 1 capable of performing a test for the sticking phenomenon in a self-diagnosis mode. Such test is therefore frequently called "sticking self-diagnosis" or simply "sticking test."

The capacitive acceleration sensing unit 1 is provided with a capacitive sensor 10 and a detection circuit 100 electrically connected to the sensor 10. The capacitive sensor 10 has two fixed electrodes 11 and 12 and a single movable electrode 13. The detection circuit 100 is configured to detect acceleration (i.e., one kind of physical quantity) on changes in electric charge in the capacitive sensor 10. Such changes are caused in response to movements of the movable electrode 13.

The capacitive sensor 10 may be produced into any type, as long as two control voltage signals CW1 and CW2 whose polarities are periodically reversed between low and high levels and opposite to each other are applied to the fixed electrodes 11 and 12 so that acceleration can be detected on changes in electric charge responding to movements of the movable sensor 13. To the fixed electrodes 11 and 12 of the sensor 10, the control voltage signals CW1 and CW2 are fed, respectively.

The detection circuit 100 is provided with various circuits, as shown in FIG. 1. Such various circuits include a charge-to-voltage (CV) converting circuit 20, a sample and hold (SH) circuit 30, a filtering circuit 40, a gain adjusting circuit 50, a power supply circuit 60, a control circuit 70, a switch circuit 80, and a clock generator 90.

Of these circuits, the CV converting circuit 20 has an input terminal electrically connected with the movable electrode 13 of the capacitive sensor 10 and the SH circuit 30 has an input terminal electrically connected to an output terminal of the CV converting circuit 30. An output terminal of the SH circuit 30 is electrically connected with an input terminal of the filtering circuit 40, which also has an output terminal electrically linked with an input terminal of the gain adjusting circuit 50.

Furthermore, the power supply circuit 60 is configured to supply three types of voltage 7 [V], Vcc (e.g., 5 [V]) and Vcc/2 to necessary members of the capacitive acceleration sensing unit 1. The control circuit 70 has the capability of supplying various control signals to necessary members of the sensing unit 1. The switch circuit 80 has a configuration for selectively relaying voltages of Vcc/2 and Vcc (or 7[V]), the configuration including switchable terminals A and B to which the voltages of Vcc/2 and Vcc (or 7[V]) are fed, respectively. The clock generator 90 generates a clock signal to be fed to the control circuit 70.

The CV converting circuit 20 is composed of a charge amplifier to convert to a voltage signal an amount of electric charge sensed by the movable electrode 13 in the capacitive sensor 10. The charge amplifier has an operational amplifier 22, a capacitor 24, and an electrical switch 26. The operational amplifier 22 has a non-inverting input terminal electrically coupled with the movable electrode 13 and an inverting input terminal electrically coupled with an output (common) of the switch circuit 80. Both of the capacitor 24 and the switch 26 are placed in parallel to each other and connect the output and the non-inverting input terminal of the amplifier 22. In addition, the switch 26 is controlled in an on/off manner by a signal SW coming from the control circuit 70. Via the switch circuit 80, the inverting input terminal of the operational amplifier 22 receives either of the voltage signal Vcc/2 or a sticking-test voltage Vcc (or 7 [V]). If the power supply voltage Vcc is 5 [V], Vcc/2 becomes 2.5 [V] called mid-voltage. The sticking-test voltage of 7 [V] is a value previously determined so that the self-diagnosis for the sticking phenomenon can be performed in a steady manner.

The switch circuit 80 is configured to respond to a mode switchover signal MS issued from the control circuit 70 in such a manner that the input terminals A and B are selectively turned on. The mode is composed of two modes of a measurement mode for measuring acceleration, which is carried out in the same manner as conventional, and a self-diagnosis mode for the sticking test. When the measurement mode is instructed by the mode switchover signal MS, the switch circuit 80 selects to relay the mid-voltage Vcc/2 via the terminal A, while when the self-diagnosis mode is instructed by the signal MS, the switch circuit 80 selects to relay the voltage Vcc as a test voltage via the terminal B. Instead of the voltage of Vcc itself, the voltage 7 [V] higher than the voltage Vcc may be used.

The SH circuit 30 is configured to receive both of a sampling timing control signal SH from the control circuit 70 and an output signal from the CV converting circuit 20 in order to sample and hold the output signal at the specified timing by the control signal SH.

The filtering circuit 40 is equipped with a pre-filter 42, a switched capacitor filter (SCF) 44, and a post-filter 46. Of these filters, the pre-filter 42 has an input terminal electrically connected to the SH circuit 30. The SCF 44 has an input terminal electrically connected to an output terminal of the pre-filter 42 to selectively transmit only predetermined frequency components of the received signal responsively to a drive clock FC, which receives from the control circuit 70. Hence the SH circuit 30 is able to extract predetermined frequency components from the output of the SH circuit 30. The gain adjusting circuit 50 has a configuration for adjusting the level of an output from the SH circuit 30 depending on a control signal OL coming from the control circuit 70.

In connection with FIGS. 1 and 2, operations of the capacitive acceleration sensing unit 1 will now be explained.

This capacitive acceleration sensing unit 1 changes its operation mode by responding to an operation mode command OM given to the control circuit 70 from outside the sensing unit 1. While the control circuit 70 has yet to receive the operation mode command indicating a particular operation mode of the sensing unit 1, the circuit 70 operates on the measurement mode for measuring acceleration generated in the sensing unit 1. Moreover, when the control circuit 70 will perform control necessary for a predetermined test, such as sticking test, in response to a specific test command, the circuit 70 executes the control by issuing the necessary signals, before returning to the measurement mode.

In the case that the sensing unit 1 is in the measurement mode realized as explained above, the mode switchover signal MS allows the switch circuit 80 to be controlled such that the input terminal A is closed (on) to relay the mid-voltage Vcc/2 (=2.5 [V]). Further, the switch 26 of the charge amplifier 20 responds to the control signal SW so that the switch 26 turns on/off depending on the ON/OFF states of the signal SW. Hence a voltage detected from the movable electrode 13 is equal to an amount of approximately Vcc/2.

On the other hand, the voltages CW1 and CW2 respectively applied to the fixed electrodes 11 and 12 are either zero [V] or Vcc [V] and repeated at intervals with polarities (corresponding to logical values "1" and "0") opposite from each other between the voltages CW1 and CW2. Accordingly, both of a potential difference between the one fixed electrode 11 and the movable electrode 13 and a further potential difference between the movable electrode 13 and the other fixed electrode 12 are Vcc/2, which are equal to each other. Hence the movable electrode 13 cannot be displaced, unless an external force is applied to the sensing unit 1.

Incidentally, in this sensing unit 1, the frequencies of the control voltages CW1 and CW2 are set far above higher than the first resonance frequency of the movable electrode 13. Each of the control voltages CW1 and CW2 is switched on/off at a fast speed that allows influence of the switchovers onto the displacement of the movable electrode 13 to be negligible.

In cases where the capacitive acceleration sensing unit 1 senses acceleration so that the movable electrode 13 is displaced toward either the fixed electrode 11 or 12, an amount of electric charge accumulated between the fixed electrode 11 or 12 and the movable electrode 13 changes responsively. Hence an amount of electric charge sensed by the movable electrode 13 is changed as well. This change is converted to a corresponding voltage value by the CV converting circuit 20. The converted voltage, that is, the output voltage from the CV converting circuit 20 is then subject to sample and hold processing carried out by the SH circuit 30 at each temporal instant specified by the timing signal SH from the control circuit 70.

A sample/hold-processed output signal from the SH circuit 30 is then sent to the filtering circuit 40, where only predetermined frequency components are extracted from the output signal from the SH circuit 30. Such predetermined frequency components make up a voltage depending on the amplitude of the acceleration that the sensing unit 1 has sensed. The voltage from the filtering circuit 40 is then subjected to amplification of gain at the gain adjusting circuit 50, thereby providing an output signal $V_o$, as exemplified in FIG. 2.

The control circuit 70 is able to respond to the operation mode command indicative of a sticking test from an external apparatus, such as controller of an on-vehicle airbag system, the sticking-test command indicating the self-diagnosis mode. In such a case, the sensing unit 1 operates in the self-diagnosis mode.

When entering the self-diagnosis mode, the mode switch signal MS from the control circuit 70 changes its logical value "1 (given high level)" during a predetermined period of time $T_{mea}$, as shown in FIG. 2. Thus, the internal contacts A and B in the switch circuit 80 are allowed to switch over from the contact A to the contact B to relay a diagnosing voltage of Vcc (or 7 [V]) to the charge amplifier 20. Concurrently with this, during the predetermined period of time $T_{mea}$, the switch 26 of the CV converting circuit 20 is held "ON" by a logical value "1 (given high level)" of the control signal SW from the controlling circuit 70. As a result, the voltage at the movable electrode 13 is held at Vcc (or 7 [V]).

In addition, during the above period of time $T_{mea}$, of the two control signals CW1 and CW2, one control signal CW1 is kept at Vcc, while the other control signal CW2 is kept at 0 [V], as shown in FIG. 2. This control will cause a potential difference "Vs-CW1 (corresponding to a first bias voltage)" between the fixed electrode 11 and the movable electrode 13 to be zero as well as a further potential difference "Vs-CW2 corresponding to a second bias voltage)" between the movable electrode 13 and the fixed electrode 12 to be Vcc. Accordingly, there occurs a difference in the electrostatic forces applied to the movable electrode 13, whereby the movable electrode 13 is pulled toward the one side, that is, toward the fixed electrode 12. Thus the movable electrode 13 will stick to the fixed electrode 12.

In this sticking test, as occasion arise, the Vcc serving as the sticking-test voltage may be replaced by a higher voltage of 7 [V]. Such a higher voltage makes sure that the movable electrode 13 sticks to (i.e., comes in contact with) the fixed electrode 12.

On ending the foregoing predetermined period of time $T_{mea}$, the controlling circuit 70 performs the processing for forcibly returning the operation mode to the foregoing measurement mode in an automatic manner.

It is therefore natural that the sticking is released, provided that the movable electrode 13 will return, without fail, to its intermediate position between the fixed electrodes 11 and 12, which is normal in the operation of the sensing unit 1. In such a normal state under which the switch circuit 80 relays the mid-voltage to the charge amplifier 20, the output voltage $V_O$ obtained from the gain adjusting circuit 50 will also return to its normal value $V_N$, if the movable electrode 13 is pulled back to its intermediate position to smoothly establish a separation from the fixed electrode 12.

In contrast, if such a smooth and sure separation cannot be attained, that is, if the movable electrode 13 still keeps touching the fixed electrode 12, the output voltage $V_O$ will fixedly represent a higher or lower level $V_H$ or $V_L$ than the normally returned level $V_N$, as pictorially shown in FIG. 2. It is therefore possible for a not-shown processing unit to detect whether or not the sticking phenomenon has occurred in the capacitive sensor 10 by examining the output voltage $V_O$ after the end of the test mode.

As described, in the capacitive acceleration sensing unit 1 into which the method and unit for sensing physical quantity such as acceleration, whether or not the movable electrode is in touch with a fixed electrode within the capacitive sensor 10 can easily be tested in an automatic fashion. Accordingly, it is possible to easily and steadily self-diagnose (self-test) the sticking characteristic inherent to each capacitive sensor incorporated in the unit. The self-diagnosis is carried out with the sticking caused surely on the assumption that an excessive-amplitude physical quantity has been applied to the unit.

Second Embodiment

Figure 3:
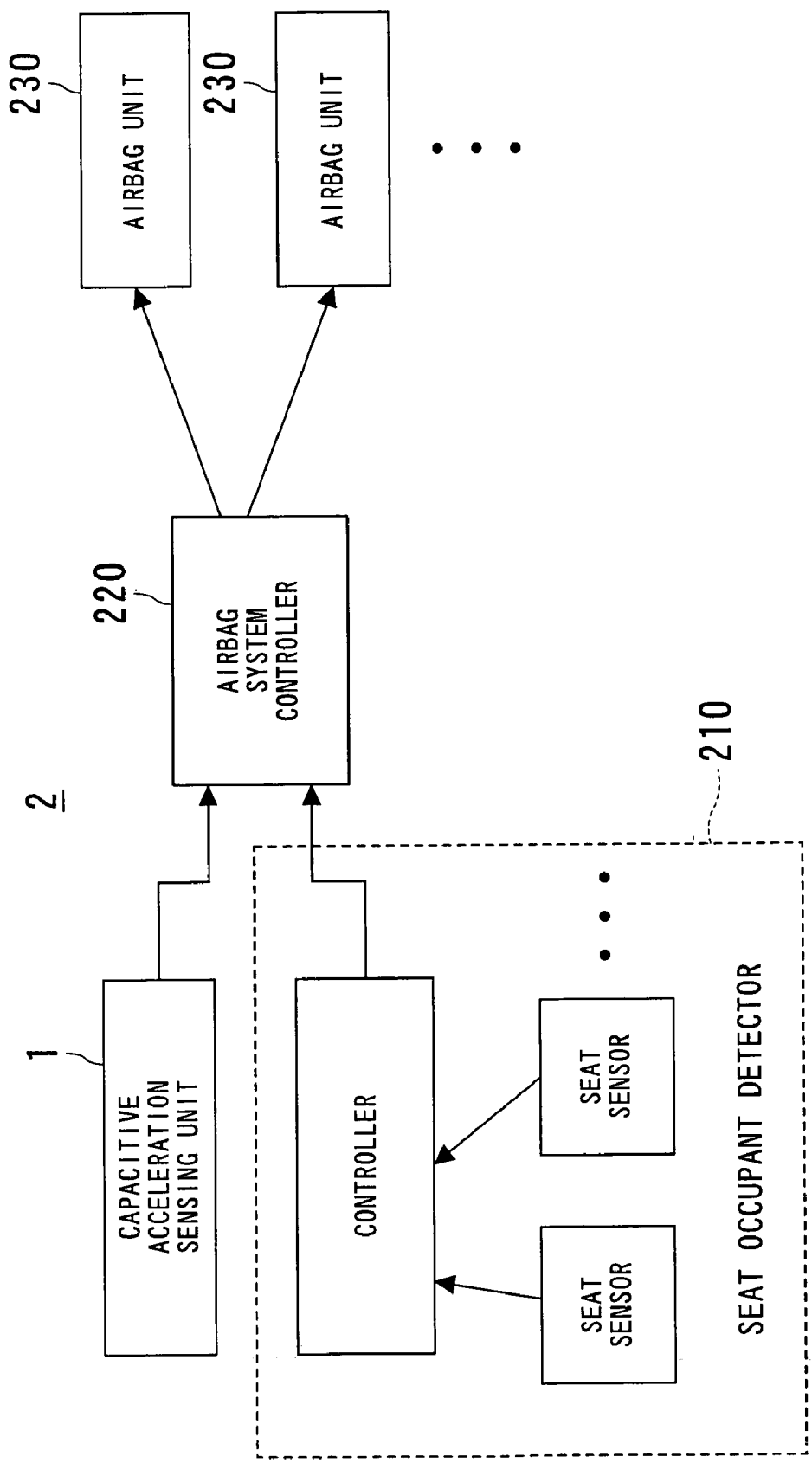
FIG. 3 is an outlined block diagram showing an on-vehicle airbag system employing the capacitive acceleration sensor.

Referring to FIG. 3, a second embodiment of the present invention will now be explained. In the present embodiment, for the sake of a simplified explanation, the identical components to those in the first embodiment will be explained with the same references employed in the first embodiment.

This embodiment relates to an application of the foregoing capacitive acceleration sensing unit 1 explained in the first embodiment. A practical application is directed to an on-vehicle airbag system 2.

As shown in FIG. 3, the on-vehicle airbag system 2 is provided with, in addition to the capacitive acceleration sensing unit 1 explained in the first embodiment, a seat occupant detector 210, an airbag system controller 220, and one or more airbag units 230. The seat occupant detector 210 is disposed to detect the type of a seat occupant (an adult, a child, or an infant on a child seat). This seat occupant detector 210 may be omitted, if unnecessary.

When receiving from the sensing unit 1 a voltage signal $V_O$ indicative of acceleration of an amplitude higher than a predetermined level due to, for example, a collision of the vehicle, the airbag system controller 220 uses an output signal from the detector 210 to control the operations of airbags (not shown) of the airbag units 230.

Meanwhile, the airbag system controller 220 also answers to such a detection of the acceleration whose amplitude is above the predetermined level, by issuing a command for testing the stuck state of the capacitive sensor 10. Practically, the controller 220 sends out the operation mode command OM indicating the sticking-test command toward the controlling circuit 70 of the sensing unit 1. As a result of it, the controlling circuit 70 will enter its self-diagnosis mode to perform the sticking test, as explained in the first embodiment.

As described, the airbag system 2 according to the present embodiment makes it possible to control the airbags, while it is steadily determined whether or not the capacitive sensor 10 is in the stuck state. This is very helpful in reliably controlling the on-vehicle airbags.

Modifications

In the self-diagnosis mode in the foregoing embodiments, the bias voltage applied to the movable electrode 13 is controlled to make the movable electrode 13 touch with the one fixed electrode 12. However this is not a definitive list. The bias voltage applied to the movable electrode 13 is controlled so that the movable electrode 13 touches with the other fixed electrode 13.

Furthermore, the self-diagnosis mode may be set as follows. When entering the self-diagnosis mode, the movable electrode 13 is made to touch with the one fixed electrode 12 and then to touch the other fixed electrode 11 on completion of the first touch with the fixed electrode 12, before ending the self-diagnosis mode. Then it can be determined whether or not the output voltage $V_O$ of the sensing unit 1 is lower or higher than the normal level for diagnosis of the sticking phenomenon.

Figure 4:
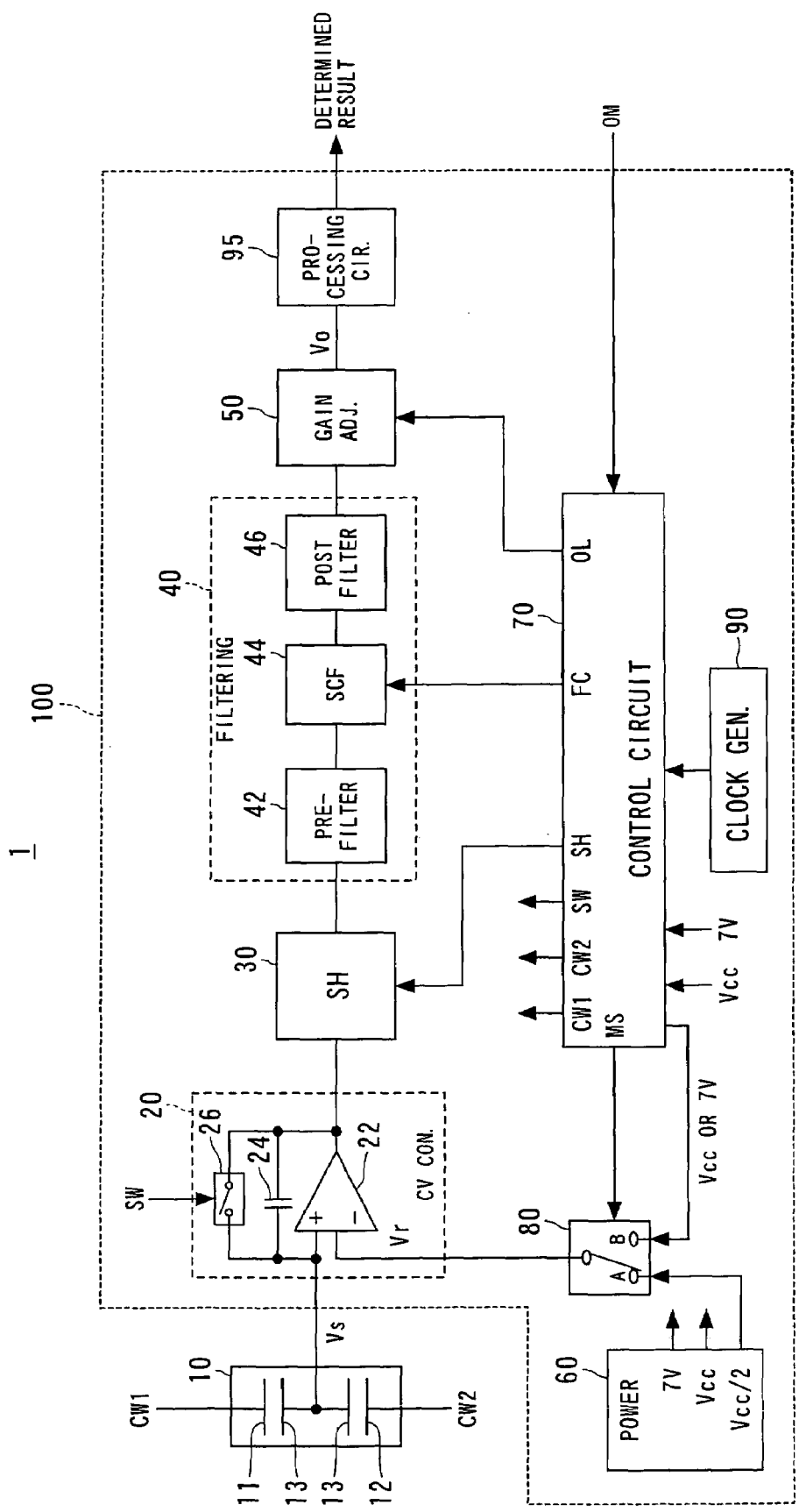
FIG. 4 is a block diagram outlining the configuration of a capacitive acceleration sensing unit according to a modification of the present invention, the sensing unit having a self-diagnosis function for the sticking phenomenon.

Still further, as shown in FIG. 4, the capacitive acceleration sensing unit 1 can be formed to include a processing circuit 95. This processing circuit 95, which is formed of for example a CPU (Central Processing Unit), receives the output voltage $V_O$ and uses it to determine whether or not the output voltage $V_O$ indicates a stuck state of the capacitive senor 10.

The present invention may be embodied in other specific forms without departing from the spirit or essential characteristics thereof. The present embodiments are therefore to be considered in all respects as illustrative and not restrictive, the scope of the present invention being indicated by the appended claims rather than by the foregoing description and all changes which come within the meaning and range of equivalency of the claims are therefore intended to be embraced therein.

The entire disclosure of Japanese Patent Application No. 2003-279960 filed on Jul. 25, 2003 including the specification, claims, drawings and summary is incorporated herein by reference in its entirety.

What is claimed is:

1. A method of sensing physical quantity using a capacitive sensor equipped with a first fixed electrode and a second fixed electrode disposed face to face and a movable electrode disposed between the first and second fixed electrodes so as to form variable first and second capacitors whose capacitances vary in response to the physical quantity sensed by the movable electrode, comprising:

first adjusting a first bias voltage applied between the first fixed electrode and the movable electrode and a second voltage applied between the movable electrode and the second fixed electrode respectively to allow the movable electrode to be brought into contact with either of the first and second fixed electrodes;

second adjusting the first and second bias voltages to allow the movable electrode to return to a non-contact original position thereof between the first and second fixed electrodes, the second bias voltage adjustment performed by the second adjusting means following the first bias voltage adjustment performed by the first adjusting means; and detecting, for self-diagnosis of the unit, an output signal corresponding to a relationship of capacitances between the first and second capacitors.

2. The method according to claim 1, wherein the first adjusting step applies (i) a potential of higher than Vcc between the first fixed electrode and the movable electrode so that the first bias voltage becomes zero, and (ii) a potential of zero to the second fixed electrode so that the second bias voltage becomes a voltage of Vcc, the Vcc being a power supply voltage to the capacitive sensor.

3. The method according to claim 2, wherein the potential of higher than the voltage of Vcc is a potential predetermined so as to allow the movable electrode to be brought into contact with the first fixed electrode.

4. The method according to claim 1, wherein the first adjusting step applies (i) a potential of higher than Vcc between the second fixed electrode and the movable electrode so that the second bias voltage becomes zero, and (ii) a potential of zero to the first fixed electrode so that the first bias voltage becomes a voltage of Vcc, the Vcc being a power supply voltage to the capacitive sensor.

5. The method according to claim 4, wherein the potential of higher than the voltage of Vcc is a potential predetermined to allow the movable electrode to be brought into contact with the second fixed electrode.

6. The method according to claim 1, further comprising a step of determining, as the self-diagnosis of the unit, whether or not the output signal is out of order.

7. The method according to claim 6, wherein the determination step determines whether or not the output signal is fixedly biased toward a level higher or lower than a predetermined normal level detected when the movable electrode is at an intermediate position between the first and second fixed electrodes, the intermediate position being the non-contact original position.

8. A unit for sensing physical quantity comprising:

a capacitive sensor equipped with a first fixed electrode and a second fixed electrode disposed face to face and a movable electrode disposed between the first and second fixed electrodes so as to form variable first and second capacitors whose capacitances vary in response to a physical quantity sensed by the movable electrode;

an adjusting circuit adjusting, in a first step, a first bias voltage applied between the first fixed electrode and the movable electrode and a second bias voltage applied between the movable electrode and the second fixed electrode respectively to allow the movable electrode to be brought into contact with either of the first and second fixed electrodes, and adjusting, in a second step, the first and second bias voltages to allow the movable electrode to return to non-contact original position thereof between the first and second fixed electrodes, the second step following the first step; and a detecting circuit detecting, for self-diagnosis of the unit, an output signal corresponding to a relationship of capacitances between the first and second capacitors.

9. The unit according to claim 8, wherein, in the first step, the adjusting circuit is configured to apply (i) a potential of higher than Vcc between the first fixed electrode and the movable electrode so that the first bias voltage becomes zero, and (ii) a potential of zero to the second fixed electrode so that the second bias voltage becomes a voltage of Vcc, the Vcc being a power supply voltage to be applied to the unit.

10. The unit according to claim 9, wherein the potential of higher than the voltage of Vcc is a potential predetermined as to allow the movable electrode to be brought into contact with the first fixed electrode.

11. The unit according to claim 8, wherein, in the first step, the adjusting circuit is configured to apply (i) a potential of higher than Vcc between the second fixed electrode and the movable electrode so that the second bias voltage becomes zero, and (ii) a potential of zero to the first fixed electrode so that the first bias voltage becomes a voltage of Vcc, the Vcc being a power supply voltage to be applied to the unit.

12. The unit according to claim 11, wherein the potential of higher than Vcc is a potential predetermined so as to allow the movable electrode to be brought into contact with the second fixed electrode.

13. The unit according to claim 8, further comprising a determination circuit configured to determine, as the self-diagnosis of the unit, whether or not the output signal is out of order.

14. The unit according to claim 13, wherein the determination circuit is configured to examine the output signal for being fixedly biased toward a level higher or lower than a pre-determined normal level detected when the movable electrode is at an intermediate position between the first and second fixed electrodes, the intermediate position being the non-contact original position.

15. The unit according to claim 8, further comprising a measuring circuit for measuring the physical quantity, wherein the measuring circuit is provided with a first circuit applying between the first and second fixed electrodes a voltage signal whose frequency is higher than a resonance frequency of the movable electrode and whose polarities are inverted at intervals between zero and Vcc and a second circuit applying to the movable electrode a voltage of Vcc/2, the Vcc being a power supply voltage to be applied to the unit.

16. The unit according to claim 8, wherein the unit is configured to detect, as the physical quantity, applied to the unit.

17. A unit for sensing physical quantity comprising:
a capacitive sensor equipped with a first fixed electrode and a second fixed electrode disposed face to face and a movable electrode disposed between the first and second fixed electrodes so as to form variable first and second capacitors whose capacitances vary in response to a physical quantity sensed by the movable electrode;
first adjusting means for adjusting a first bias voltage applied between the first fixed electrode and the movable electrode and a second bias voltage applied between the movable electrode and the second fixed electrode respectively to allow the movable electrode to be brought into contact with either of the first and second fixed electrodes;
second adjusting means for adjusting the first and second bias voltages to allow the movable electrode to return to non-contact original position thereof between the first and second fixed electrodes, the second bias voltage adjustment performed by the second adjusting means following the first bias voltage adjustment performed by the first adjusting means; and
means for detecting, for self-diagnosis of the unit, an output signal corresponding to a relationship of capacitances between the first and second capacitors.

18. An on-vehicle airbag system comprising:
an airbag unit mounted on a vehicle and formed to have an airbag;
a physical quantity sensing unit sensing a physical quantity as a signal indicative of the sensed physical quantity; and
a controller controlling a development of the airbag in response to the signal outputted by the sensing unit,
wherein the physical quantity sensing unit comprises:
a capacitive sensor equipped with a first fixed electrode and a second fixed electrode disposed face to face and a movable electrode disposed between the first and second fixed electrodes so as to form variable first and second capacitors whose capacitances vary in response to a physical quantity sensed by the movable electrode;
an adjusting circuit adjusting, in a first step, a first bias voltage applied between the first fixed electrode and the movable electrode and a second bias voltage applied between the movable electrode and the second fixed electrode respectively to allow the movable electrode to be brought into contact with either of the first and second fixed electrodes, and adjusting, in a second step, the first and second bias voltages to allow the movable electrode to return to a non-contact original position thereof between the first and second fixed electrodes, the second step following the first step;
a detecting circuit detecting, for self-diagnosis of the unit, an output signal corresponding to a relationship of capacitances between the first and second capacitors; and
a determining unit determining whether or not the output signal detected by the detecting circuit is out of order, as the self-diagnosis of the unit.

* * * * *